(12) United States Patent
Seo

(10) Patent No.: US 8,982,767 B2
(45) Date of Patent: Mar. 17, 2015

(54) METHOD FOR TRANSCEIVING DATA WITH BOTH A MOBILE STATION AND A RELAY STATION IN A BROADBAND WIRELESS COMMUNICATION SYSTEM

(75) Inventor: Hanbyul Seo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 271 days.

(21) Appl. No.: 13/265,416

(22) PCT Filed: May 11, 2010

(86) PCT No.: PCT/KR2010/002980
§ 371 (c)(1),
(2), (4) Date: Oct. 20, 2011

(87) PCT Pub. No.: WO2010/131886
PCT Pub. Date: Nov. 18, 2010

(65) Prior Publication Data
US 2012/0039241 A1    Feb. 16, 2012

Related U.S. Application Data

(60) Provisional application No. 61/177,635, filed on May 12, 2009, provisional application No. 61/184,316, filed on Jun. 5, 2009.

(51) Int. Cl.
*H04W 40/00*    (2009.01)
*H04B 7/155*    (2006.01)
*H04L 1/18*    (2006.01)

(52) U.S. Cl.
CPC ........ *H04B 7/15557* (2013.01); *H04B 7/15542* (2013.01); *H04L 1/1829* (2013.01)
USPC ....................................... 370/315

(58) Field of Classification Search
USPC ................... 714/748; 455/9; 370/315, 338
See application file for complete search history.

(56) References Cited

U.S. PATENT DOCUMENTS

| 7,765,451 B2 | 7/2010 | Yomo et al. | |
| 2007/0275656 A1* | 11/2007 | Chang et al. | 455/9 |
| 2008/0209299 A1* | 8/2008 | Chang et al. | 714/748 |
| 2008/0209301 A1 | 8/2008 | Chang et al. | |
| 2008/0219229 A1* | 9/2008 | Zheng | 370/338 |
| 2010/0232345 A1* | 9/2010 | Tsai et al. | 370/315 |

FOREIGN PATENT DOCUMENTS

| KR | 10-2007-0058077 A | 6/2007 |
| KR | 10-2007-0114664 A | 12/2007 |
| KR | 10-2008-0079155 A | 8/2008 |
| KR | 10-2008-0079567 A | 9/2008 |

* cited by examiner

*Primary Examiner* — Kevin C Harper
*Assistant Examiner* — Derrick V Rose
(74) *Attorney, Agent, or Firm* — Birch, Stewart, Kolasch & Birch, LLP

(57) ABSTRACT

A method for transceiving data with both a mobile station and a relay station in a mobile communication system are disclosed. In a present invention, the base station transmits an ACK signal regardless of whether a result of the decoding is successful or unsuccessful to the terminal for using a uplink packet data transmitted from the relay station. And, the relay station operates two operation modes. Procedures of downlink/uplink packet data transmission according to the operation mode are disclosed.

7 Claims, 12 Drawing Sheets

BS (base station) (10)     UE (user equipment) (20)

METHOD FOR TRANSCEIVING DATA WITH BOTH A MOBILE STATION AND A RELAY STATION IN A BROADBAND WIRELESS COMMUNICATION SYSTEM

This application is the National Phase of PCT/KR2010/002980 filed on May 11, 2010, which claims priority under 35 U.S.C. 119(e) to US Provisional Application Nos. 61/177,635 filed on May 12, 2009 and 61/184,316 filed on Jun. 5, 2009, all of which are hereby expressly incorporated by reference into the present application.

TECHNICAL FIELD

The present invention relates to a broadband wireless communication system, and particularly, to a Relay Node (RN) system in a mobile communication system.

BACKGROUND ART

Techniques, apparatus and systems described herein can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc.

The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advance (LTE-A) is an evolution of the 3GPP LTE. For clarity, this application focuses on the 3GPP LTE/LTE-A.

However, technical features of the present invention are not limited thereto.

In FIG. 1, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms.

One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period.

A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

In FIG. 2, a downlink slot includes a plurality of OFDM symbols in time domain. It is described herein that one downlink slot includes 7 OFDM symbols, and one resource block (RB) includes 12 subcarriers in frequency domain as an example. However, the present invention is not limited thereto.

Each element on the resource grid is referred to as a resource element. One RB includes 12×7 resource elements. The number NDL of RBs included in the downlink slot depends on a downlink transmit bandwidth. The structure of an uplink slot may be same as that of the downlink slot.

In FIG. 3, a maximum of three OFDM symbols located in a front portion of a 1st slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc.

A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information.

The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

In FIG. 4, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

In FIG. 5, a wireless communication system includes a BS(10) and one or more UE(20). In downlink, a transmitter may be a part of the BS(10), and a receiver may be a part of the UE(20).

In uplink, a transmitter may be a part of the UE(20), and a receiver may be a part of the BS(10). A BS(10) may include a processor (11), a memory (12), and a radio frequency (RF) unit (13). The processor (11) may be configured to implement proposed procedures and/or methods described in this application. The memory (12) is coupled with the processor (11) and stores a variety of information to operate the processor (11). The RF unit (13) is coupled with the processor (11) and transmits and/or receives a radio signal.

A UE(20) may include a processor (21), a memory (22), and a RF unit (23). The processor (21) may be configured to implement proposed procedures and/or methods described in this application. The memory (22) is coupled with the processor (21) and stores a variety of information to operate the processor (21). The RF unit (23) is coupled with the processor (21) and transmits and/or receives a radio signal. The BS(10) and/or the UE(20) may have single antenna and multiple antenna. When at least one of the BS (10) and the UE(20) has multiple antenna, the wireless communication system may be called as multiple input multiple output (MIMO) system.

In a 3GPP LTE system, there are two types relay node.

A type II relay node (RN) cannot transmit its own common RS (CRS) as it does not have a separate cell ID and appears as a part of the donor eNB at least to Rel-8 UEs. Thus, it is assumed in prior arts that a type II RN does not transmit CRS but uses dedicated RS (DRS) to assist the demodulation of PDSCH transmitted by RN.

FIG. 6 illustrates an example of the prior arts: At subframe n, a eNB tries initial transmissions of PDSCH to UEs, and RNs overhear these transmissions for data relaying at subframe (n+k). A UE1, a Rel-8 UE to be served by RN1 at subframe (n+k), is configured to be in the DRS mode. At subframe (n+k), RNs transmits the overheard PDSCH without transmitting CRS. As no CRS is transmitted by a RN1, we have no choice but to rely on DRS in transmitting PDSCH to the UE1. RS defined in Rel-10 can be used for the PDSCH transmission to a UE2 which is a Rel-10 UE.

As type II RN does not transmit PDCCH, the scheduling information for each PDSCH/PUSCH is transmitted from eNB. This means that a type II RN forwards PDSCH/PUSCH according to the scheduling decision made by the centralized scheduler located in eNB.

Therefore, it is required to design PDSCH/PUSCH forwarding procedures that define the transmission timing of relevant signals including control information and relayed data in consideration of the half-duplex operation of RN.

Also, RN which receives PUSCH from a UE should forward the decoding result (and/or the decoded PUSCH) to eNB prior to the PHICH transmission timing in order for eNB to generate PHICH ACK or NACK. However, as the UE expects the fixed PHICH timing in 3GPP LTE system, it is difficult for RN to deliver the PUSCH decoding result to eNB in advance.

The eNB cannot utilize the RN's decoding result in generating the corresponding PHICH content (ACK or NACK) while keeping the predetermined PHICH timing.

Thus, a solution is required to resolve this PHICH transmission problem in the case of Type II relay.

DISCLOSURE OF INVENTION

Solution to Problem

Therefore, an object of the present invention is to provide a method for transceiving data with both a mobile station and a relay station, comprising: receiving, by the base station from the mobile station, an uplink data; decoding, by the base station, the received uplink data; transmitting, by the base station, an ACK signal regardless of whether a result of the decoding is successful or unsuccessful to the terminal; and receiving, by the base station, an uplink data, which is transmitted from the relay station based on the uplink data of the mobile station.

Also, the in the step of receiving the uplink data from the relay station, a decoding result of the relay station with respect to the uplink data is further received, and if the decoding result is unsuccessful, the uplink data of the relay station is used to decode the uplink data of the mobile station.

Also, the uplink data of the relay station is used if the decoding result of the relay station is successful.

Also, the present invention further includes transmitting, by the base station, a grant for retransmission to the mobile station if the decoding results are unsuccessful.

Also, the present invention further includes transmitting, by the base station, a NACK signal to the relay station if the decoding result of the relay station is successful and the usage to decode the uplink data of the mobile station is unsuccessful.

Also, the present invention further includes transmitting, by the base station, a scheduling information to the mobile station, here the scheduling information indicates uplink resources and downlink resources allocated to the mobile station, also, the uplink data from the relay station is received at a specific uplink resource, which is not allocated to the mobile station.

Also, the present invention further includes transmitting, by a base station to the relay station, a control signal for indicating an operation mode of the relay station.

Also the operation mode of the relay station is a first operation mode or a second operation mode.

Also, the first operation mode operates a reception (RX) mode in a first frequency band while it operates in a transmission (TX) mode in second frequency band at a specific subframe, and operating in the TX mode in first frequency band while it operates in the RX mode in second frequency band at the next subframe; and a second operation mode operating in RX mode both in first frequency and in second frequency bands at a specific subframe and operating in TX mode in both frequency bands at the next subframe.

Another object of the present invention is to provide method for transceiving data with both a mobile station and a relay station, comprising: transmitting, by the base station to the mobile station, an downlink data; receiving, by the base station from the relay station, a decoding result of the downlink packet data; transmitting, by the base station to the relay station, a scheduling information for transmitting the downlink packet data when the decoding result is successful; transmitting, by the base station to the relay station, a control signal for indicating an operation mode of the relay station.

Also, the operation mode of the relay station is a first operation mode or a second operation mode.

Also, the first operation mode operates a reception (RX) mode in a first frequency band while it operates in a transmission (TX) mode in second frequency band at a specific subframe, and operating in the TX mode in first frequency band while it operates in the RX mode in second frequency band at the next subframe; and a second operation mode operating in RX mode both in first frequency and in second frequency bands at a specific subframe and operating in TX mode in both frequency bands at the next subframe.

Also, present invention further includes receiving, by the base station from the relay station, response signal for the downlink packet data.

Also, the response signal is received with the decoding result of the downlink packet data when the operation mode is the first operation mode.

Also, the response signal is received after the decoding result of the downlink packet data when the operation mode is the second operation mode.

The foregoing and other objects, features, aspects and advantages of the present invention will become more apparent from the following detailed description of the present invention when taken in conjunction with the accompanying drawings.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

Figure 1:
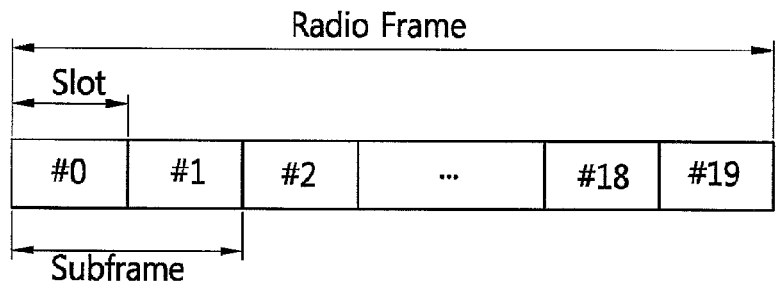
FIG. 1 is a structural view of a radio frame of 3GPP LTE.
Figure 2:
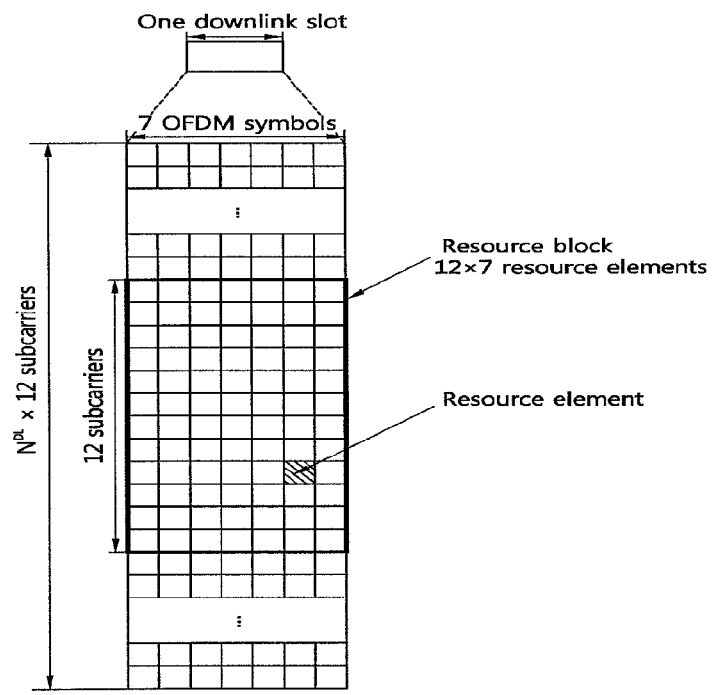
FIG. 2 shows a resource grid for one downlink slot.
Figure 3:
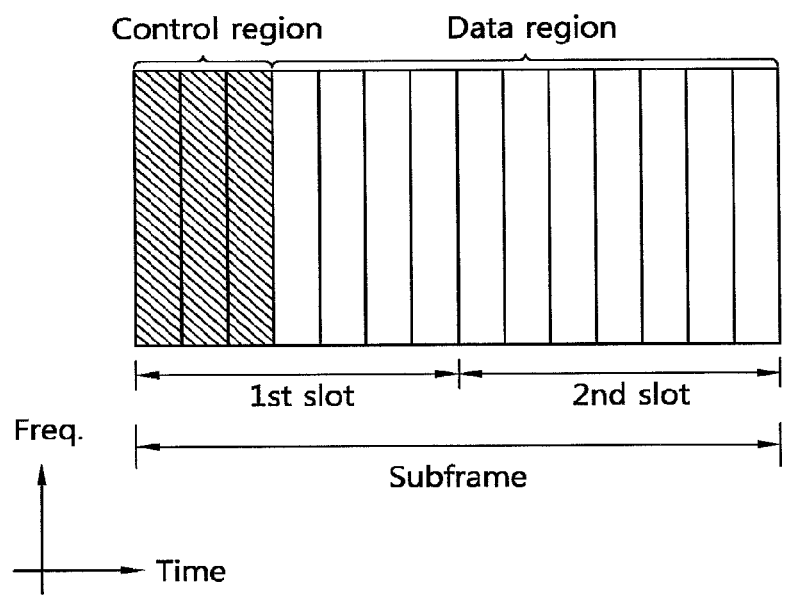
FIG. 3 shows a structure of downlink subframe.
Figure 4:
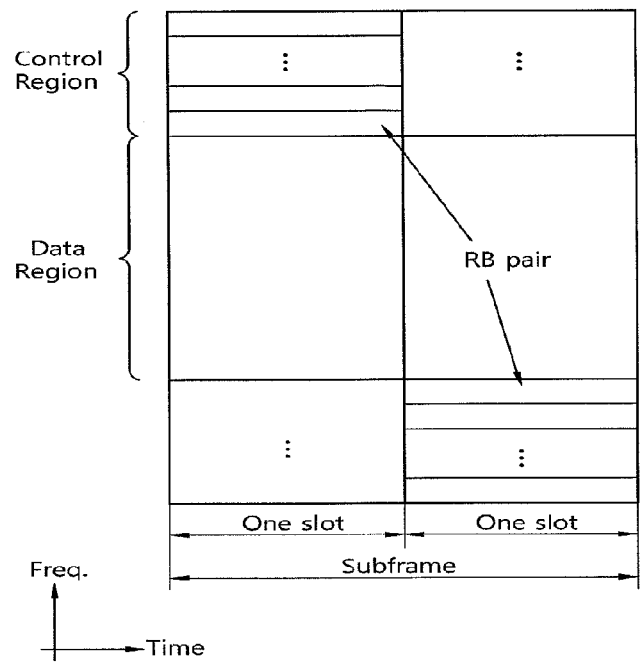
FIG. 4 shows a structure of uplink subframe.
Figure 5:
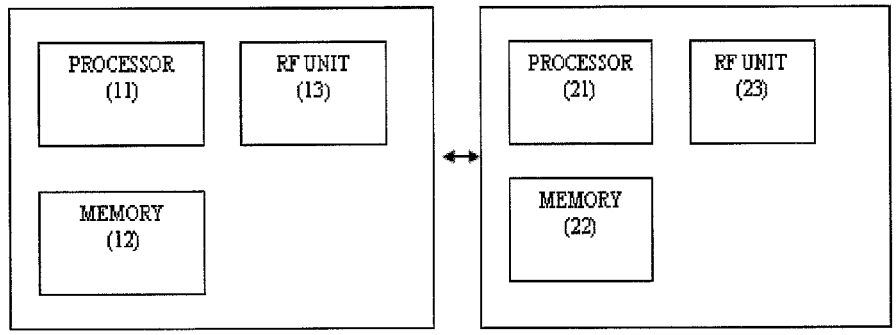
FIG. 5 shows the operation of a type II relay station in prior arts.
Figure 6:
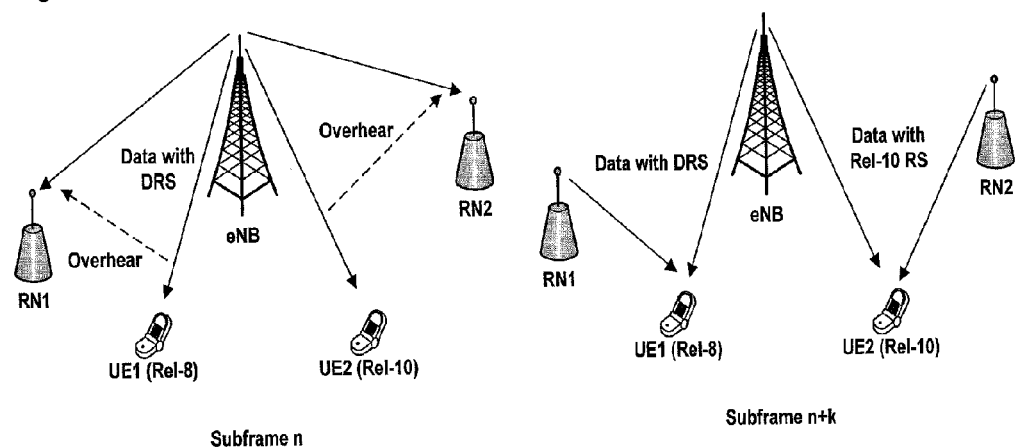
FIG. 6 shows a system for implementing present invention.

Description will now be given in detail of the present invention, with reference to the accompanying drawings.

For the sake of brief description with reference to the drawings, the same or equivalent components will be provided with the same reference numbers, and description thereof will not be repeated.

The present invention is applied to a broadband wireless communication system. However, the present invention is not limited to this, but may be applied to all communication systems and methods to which the techniques of the present invention are applicable.

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art. Unless definitely defined in the present invention, the terms are not interpreted as ideal or excessively formal meanings. Furthermore, when the technical terms used in the present invention are unsuitable technical terms that do not precisely express the techniques of the present invention, the unsuitable technical terms should be replaced by suitable technical terms that can be understood by those skilled in the art. The general terms used in the present invention should be interpreted based on the previous or next contexts, but should not be interpreted as an excessively narrowed meaning.

A singular expression includes a plural concept unless there is a contextually distinctive difference therebetween. In the present invention, a term of "include" or "have" should not be interpreted as if it absolutely includes a plurality of components or steps of the specification. Rather, the term of "include" or "have" may not include some components or some steps, or may further include additional components.

Though terms of 'first', 'second', etc. are used to explain various components, the components are not limited to the terms. The terms are used only to distinguish one component from another component. For example, a first component may be referred to as a second component, or similarly, the second component may be referred to as the first component within the scope of the present invention.

When it is mentioned that one component is "connected" or "accessed" to another component, it may be understood that the one component is directly connected or accessed to the another component or that still other component is interposed between the two components. In the meantime, when it is mentioned that one component is "directly connected" or "directly accessed" to another component, it may be understood that no component is interposed therebetween.

Hereinafter, preferred embodiments of the present invention will be explained in more detail with reference to the attached drawings. The same or similar components of one embodiment as or to those of another embodiment will be provided with the same or similar reference numerals, and their detailed explanations will be omitted. And, if it is regarded that detailed descriptions of the related art are not within the range of the present invention, the detailed descriptions will be omitted.

For explanatory clarity, the specification is disclosed based on 3GPP. However, the present invention may not limited to this.

Hereinafter, the term of a 'mobile UE' will be used. The mobile UE may be also referred to as a user equipment (UE), a mobile equipment (ME), terminal, and a mobile station (MS). The UE may be a mobile device having a communication function, such as a portable phone, a PDA, a smart phone, and a notebook. Also, the UE may be an immobile device such as a PC and a vehicle mounted device.

Also, hereinafter, the term of a 'enhanced Node B (eNB)' will be used. The eNB may be also referred to as a base station (BS), and terminal etc. . . .

This invention proposes the procedures of PDSCH/PUSCH forwarding in the presence of one or more type II RN(s). Two cases of RN operation mode are considered in this invention.

1. A first Case: RN communicates with eNB and UE alternately. In a first case, RN operates a first operation mode.

Figure 7:
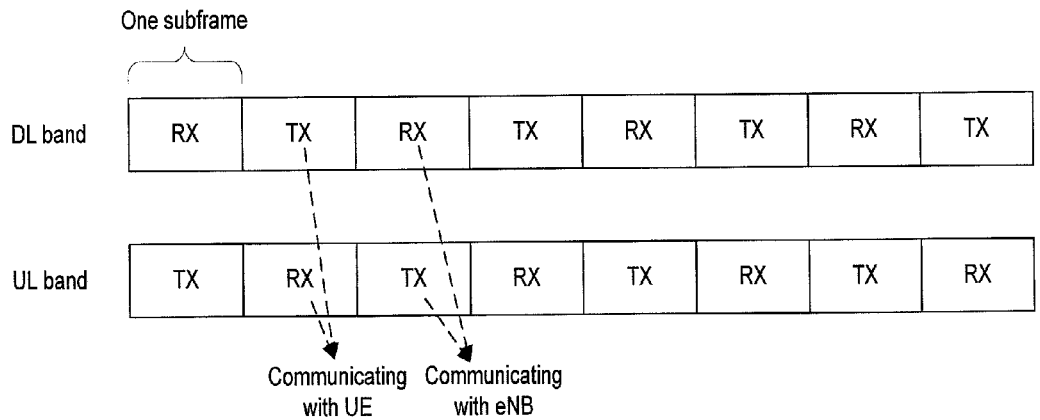
FIG. 7 shows a first operation mode of a relay station to the present invention.

FIG. 7 illustrates a first operation mode of a relay node (RN).

The RN communicates with eNB at a specific subframe and communicates with UE at the next subframe. To communicate with eNB, RN is in the reception (RX) mode in DL frequency band while it is in the transmission (TX) mode in UL frequency band.

To communicate with UE, RN is in the TX mode in DL frequency band while it is in the RX mode in UL frequency band.

Figure 8:
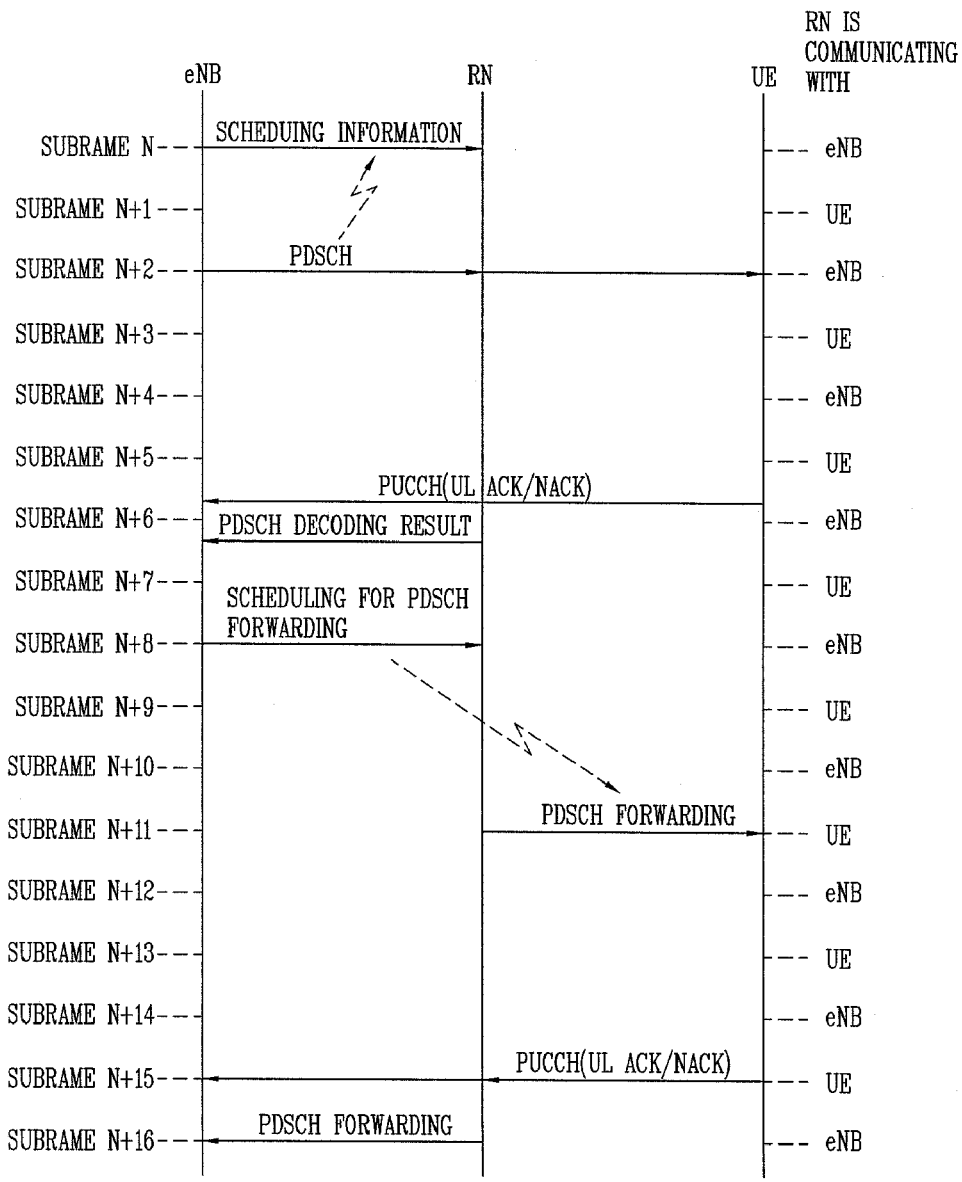
FIG. 8 is an example of PDSCH forwarding procedure through a first operation mode.

FIG. 8 illustrates the procedure of PDSCH forwarding through the first operation mode of the RN.

The proposed procedure operates as follows:

At subframe n, an eNB sends scheduling information to RN. By decoding this, A RN obtains the relevant scheduling information such as the resource allocation result and the applied MCS that are required to receive PDSCH which will be transmitted at subframe n+2. This scheduling information does not need to be sent if the RN can obtain the relevant scheduling information by receiving PDCCH transmitted at subframe n+2.

At subframe n+2, eNB transmits PDSCH. The RN and a UE receive the transmitted PDSCH.

At subframe n+6, the UE transmits PUCCH which contains ACK/NACK for the transmitted PDSCH. The RN also reports the decoding result of the PDSCH received at the subframe n+2.

At subframe n+8, the eNB sends the message that schedules RN's PDSCH forwarding at subframe n+11. It is possible to restrict the eNB such that this scheduling message is sent only when the RN's PDSCH decoding result (reported to the eNB at the subframe n+6) is successful. It is also possible for the eNB to schedule the RN to forward the erroneously received PDSCH by the amplify-and-forwarding or soft re-encoding methods.

At subframe n+11, the RN forwards the PDSCH received at the subframe n+2.

The eNB may participate in the PDSCH forwarding via cooperative transmission. It is assumed in FIG. 8 that the scheduling message for this PDSCH forwarding is transmitted at the subframe n+8, but this invention is not limited to this case.

The corresponding scheduling message may be embedded in the scheduling information transmitted at the subframe n. Alternatively, the eNB may send the corresponding scheduling message at one of the subframes n+2, n+4, n+6, n+8, and n+10. On the other hand, this explicit scheduling message becomes unnecessary if the rule of non-adaptive retransmission is applied such that the RN forwards the received PDSCH in the resource that was used in the eNB's original PDSCH transmission at the subframe n+2.

If the eNB sends the scheduling message corresponding to this PDSCH forwarding without having the RN's decoding result (i.e., sends the scheduling message before a subframe n+7) or the rule of non-adaptive retransmission is applied to this PDSCH forwarding, the validity of the scheduling message may be dependent of the RN's PDSCH decoding result.

Both the eNB and the RN regard the scheduling information as a valid one if RN reports the successful PDSCH decoding result. There are two possible operations if the RN reports the PDSCH decoding failure: First, the RN may discard the scheduling information which means that the RN does not forward the received PDSCH to the UE. Second, the RN may forward the erroneously received PDSCH to the UE by amplify-and-forwarding or soft re-encoding methods.

At subframe n+15, the UE transmits PUCCH which contains ACK/NACK for the forwarded PDSCH. The RN may receive this ACK/NACK for possible forwarding to the eNB.

At subframe n+16, the RN may forward the ACK/NACK information received at subframe n+15.

Figure 9:
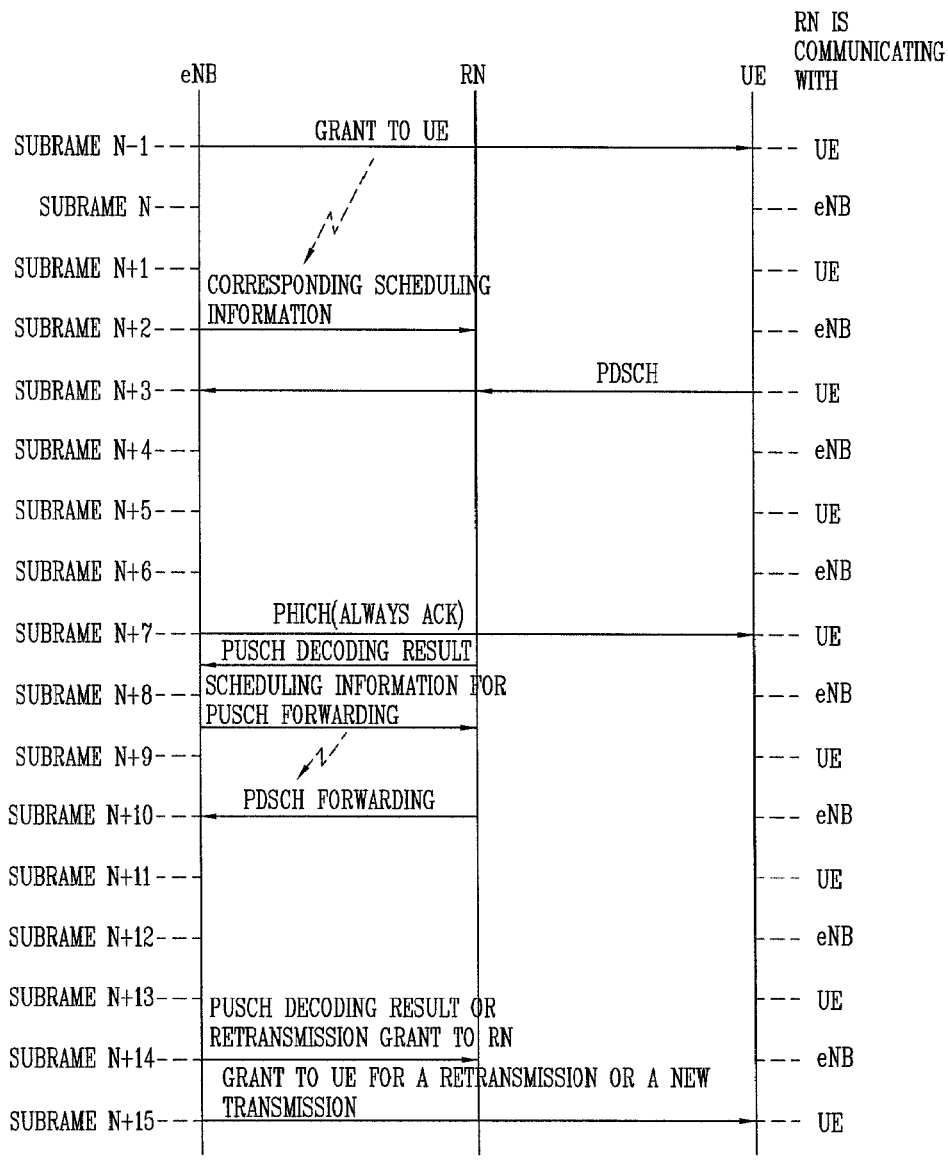
FIG. 9 is an example of PUSCH forwarding procedure through a first operation mode.

FIG. 9 illustrates the procedure of PUSCH forwarding through the first operation mode of a RN.

The proposed procedure operates as follows:

At subframe n−1, a eNB sends grant message to a UE.

At subframe n+2, the eNB sends the scheduling information to the RN. By decoding this, the RN obtains the relevant scheduling information such as the resource allocation result and the applied MCS that are required to receive PUSCH which will be transmitted at subframe n+3. It is assumed in FIG. 9 that the scheduling message for the RN's PUSCH reception is transmitted at the subframe n+2, but this invention is not limited to this case. The scheduling message may be transmitted at subframe n.

At subframe n+3, the UE transmits PUSCH. The RN and the eNB receive the transmitted PUSCH.

At subframe n+7, the eNB transmits PHICH corresponding to the PUSCH transmitted at subframe n+3. The eNB may send PHICH ACK regardless of its PUSCH decoding result in order to avoid non-adaptive retransmission of UE that would happen at subframe n+11 on receiving PHICH NACK.

At subframe n+8, the RN reports the decoding result of PUSCH received at subframe n+3. The eNB sends the scheduling message which contains the scheduling information corresponding to the PUSCH forwarding at subframe n+10.

Both the eNB and the RN regard the scheduling information as a valid one if the RN reports successful PUSCH decoding result.

There are two possible operations if the RN reports the PUSCH decoding failure.

First, the RN may discard the scheduling information which means that the RN does not forward the received PUSCH to the eNB.

Second, the RN may forward the erroneously received PUSCH to the eNB by amplify-and-forwarding or soft re-encoding methods.

At the subframe n+10, the RN forwards the PUSCH received at the subframe n+3 to the eNB.

It is assumed in FIG. 9 that the scheduling message for this PUSCH forwarding is transmitted at the subframe n+8, but this invention is not limited to this case. The corresponding scheduling message may be embedded in the scheduling information transmitted at the subframe n+2.

Alternatively, the eNB may send the corresponding scheduling message at one of the subframes n+2, n+4, n+6, and n+8.

On the other hand, this explicit scheduling message becomes unnecessary if the rule of non-adaptive retransmission is applied such that the RN forwards the received PUSCH in the resource that was used in the UE's original PUSCH transmission at the subframe n+3. Also, even though it is assumed in FIG. 9 that the PUSCH is forwarded at the subframe n+10, this invention is not limited to this case. It is also possible for the RN to forward the received PUSCH at the subframe n+8 along with the PUSCH decoding result.

At subframe n+14, the eNB may transmit its decoding result to the RN. Also, the eNB may send a retransmission grant to the RN if the RN reports the decoding success but the eNB fails to decode the forwarded PUSCH.

At subframe n+15, the eNB may transmit a retransmission grant to the UE if neither the eNB nor the RN can decode the PUSCH. Also, the eNB may transmit a grant message for a new PUSCH transmission if the forwarded PUSCH is decoded successfully.

2. A second Case: RN is in TX and RX modes alternately.

In a second case, the RN operates a second operation mode.

Figure 10:
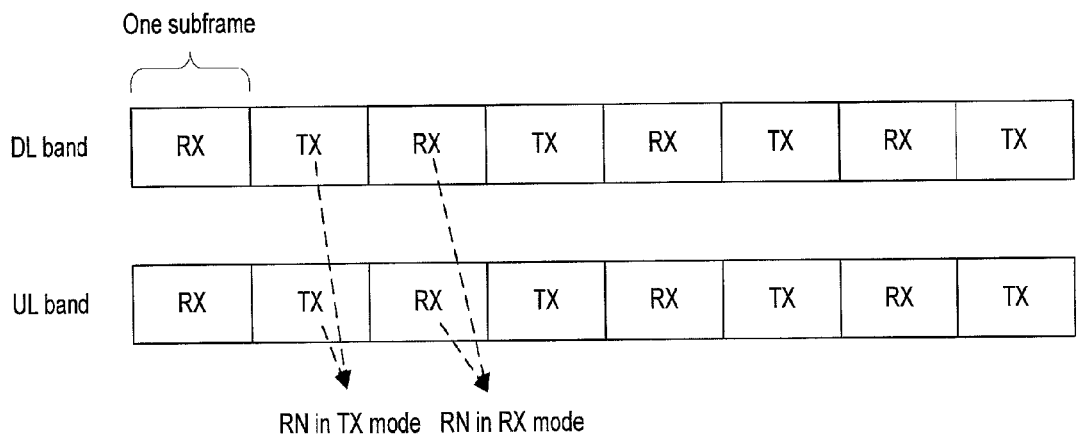
FIG. 10 shows a second operation mode of a relay station to the present invention.

FIG. 10 illustrates the second operation mode of the RN.

The RN is in RX mode both in DL and UL frequency bands at a specific subframe and is in TX mode in both frequency bands at the next subframe.

Figure 11:
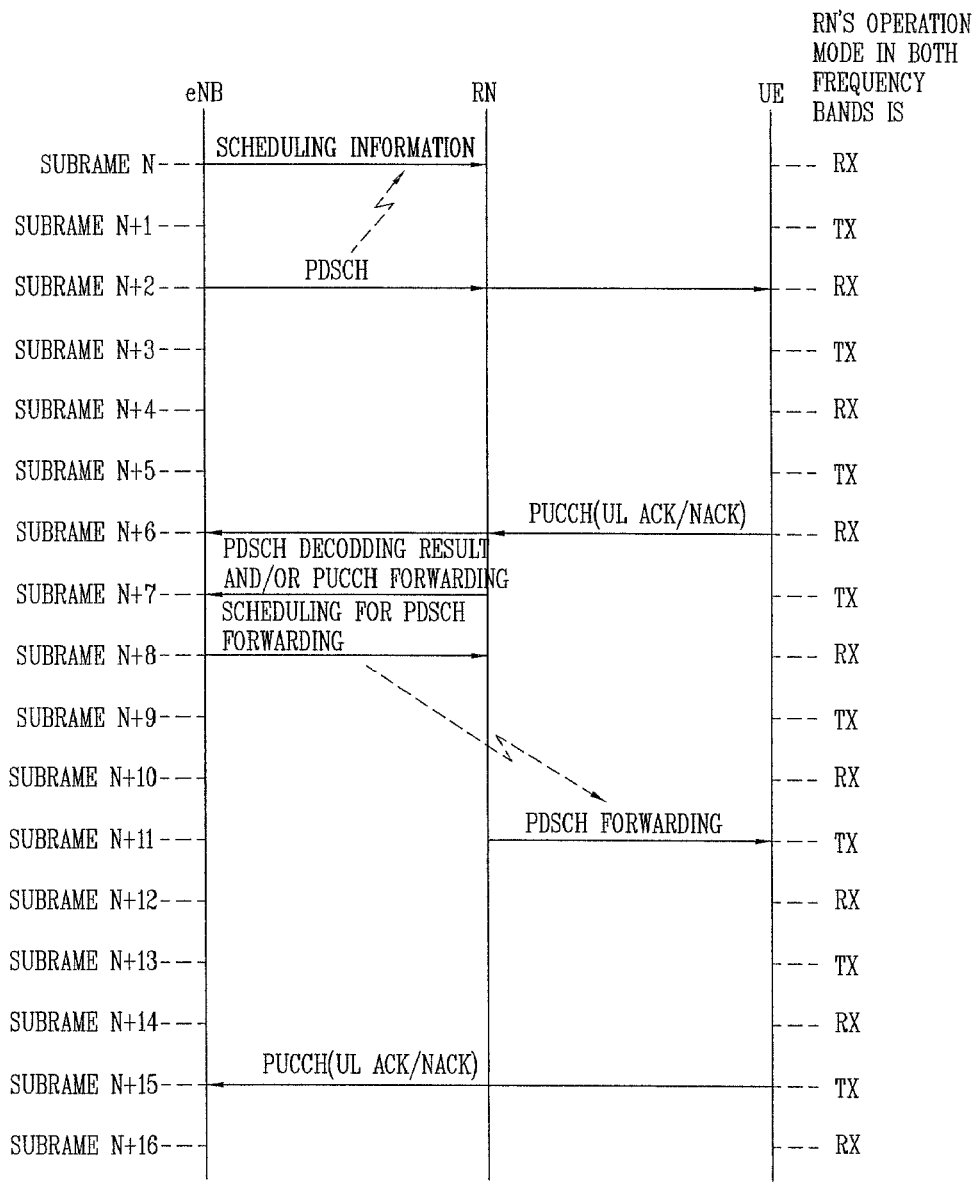
FIG. 11 is an example of PDSCH forwarding procedure through a second operation mode.

FIG. 11 illustrates the procedure of PDSCH forwarding through the second operation mode of the RN.

The proposed procedure operates as follows:

At subframe n, a eNB sends scheduling information to the RN. By decoding this, the RN obtains the relevant scheduling information such as the resource allocation result and the applied MCS that are required to receive PDSCH which will be transmitted at subframe n+2. This scheduling information does not need to be sent if the RN can obtain the relevant scheduling information by receiving PDCCH transmitted at the subframe n+2.

At the subframe n+2, the eNB transmits PDSCH. The RN and a UE receive the transmitted PDSCH.

At subframe n+6, the UE transmits PUCCH which contains ACK/NACK for the transmitted PDSCH. The RN may receive this ACK/NACK for possible forwarding to the eNB.

At subframe n+7, the RN reports the decoding result of the PDSCH received at subframe n+2. The RN may forward the ACK/NACK information received at the subframe n+6.

At subframe n+8, the eNB sends the message that schedules the RN's PDSCH forwarding at subframe n+11. It is possible to restrict the eNB such that this scheduling message is sent only when the RN's PDSCH decoding result (reported to the eNB at subframe the n+7) is successful. It is also possible for the eNB to schedule the RN to forward the erroneously received PDSCH by the amplify-and-forwarding or soft re-encoding methods.

At the subframe n+11, the RN forwards the PDSCH received at the subframe n+2. The eNB may participate in the PDSCH forwarding via cooperative transmission. It is assumed in FIG. 11 that the scheduling message for this PDSCH forwarding is transmitted at the subframe n+8, but this invention is not limited to this case. The corresponding scheduling message may be embedded in the scheduling information transmitted at the subframe n. Alternatively, The eNB may send the corresponding scheduling message at one of the subframes n+2, n+4, n+6, n+8, and n+10.

On the other hand, this explicit scheduling message becomes unnecessary if the rule of non-adaptive retransmission is applied such that the RN forwards the received PDSCH in the resource that was used in the eNB's original PDSCH transmission at the subframe n+2. If the eNB sends the scheduling message corresponding to this PDSCH forwarding without having the RN's decoding result (i.e., sends the scheduling message before subframe n+8) or the rule of non-adaptive retransmission is applied to this PDSCH forwarding, the validity of the scheduling message may be dependent of the RN's PDSCH decoding result.

Both the eNB and the RN regard the scheduling information as a valid one if the RN reports the successful PDSCH decoding. There are two possible operations if the RN reports the PDSCH decoding failure: First, the RN may discard the scheduling information which means that RN does not forward the received PDSCH to the eNB. Second, the RN may forward the erroneously received PDSCH to the eNB by amplify-and-forwarding or soft re-encoding methods.

At subframe n+15, the UE transmits PUCCH which contains ACK/NACK for the forwarded PDSCH.

Figure 12:
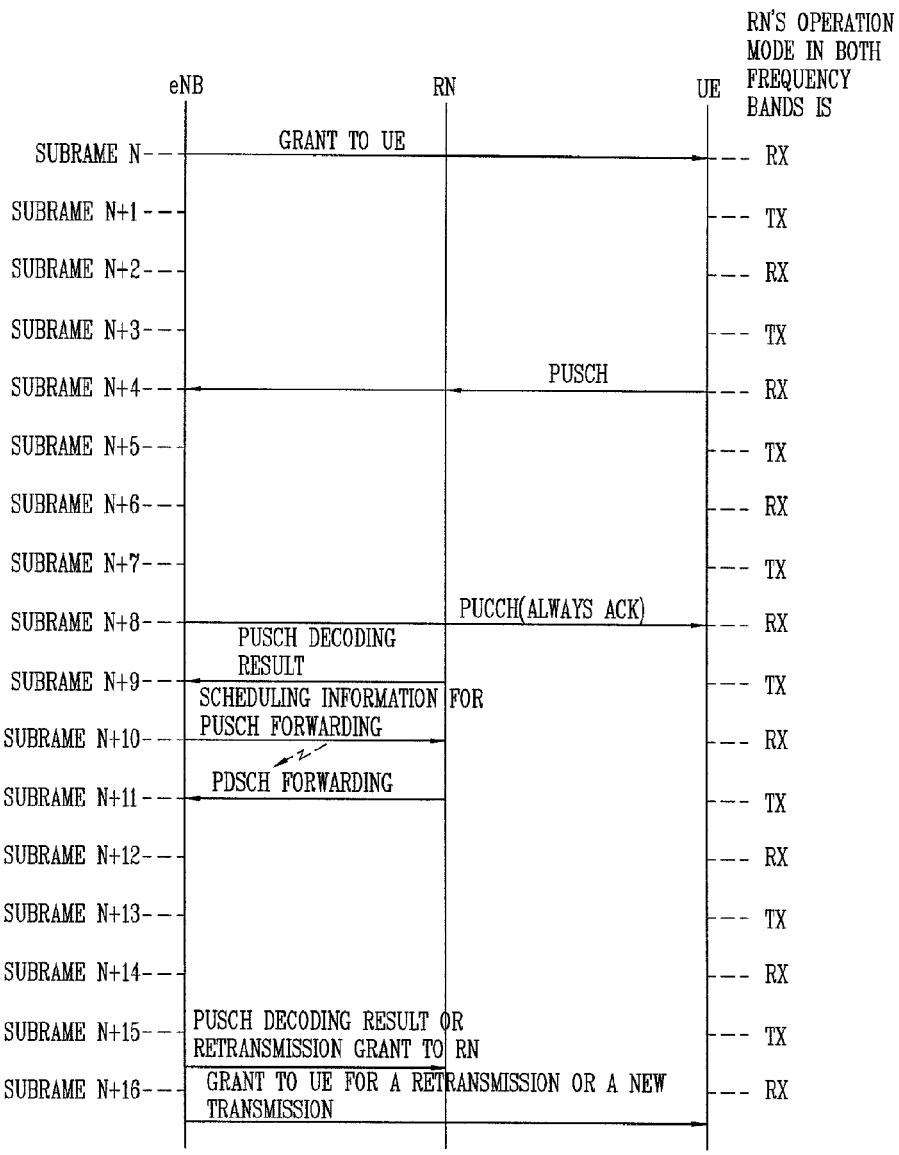
FIG. 12 is an example of PUSCH forwarding procedure through a second operation mode.

FIG. 12 illustrates the procedure of PUSCH forwarding through the second operation mode of a RN.

The proposed procedure operates as follows:

At subframe n, an eNB sends a grant message to a UE. The RN may overhear this grant message bounds to the UE if it can receive PDCCH from the eNB. Otherwise, a separate scheduling message containing the information required to receive the UE's PUSCH transmission needs to be sent to the RN.

At subframe n+4, the UE transmits a PUSCH. The RN and the UE receive the transmitted PUSCH.

At subframe n+8, the eNB transmits a PHICH corresponding to the PUSCH transmitted at the subframe n+4. The eNB may send a PHICH ACK regardless of its PUSCH decoding result in order to avoid non-adaptive retransmission of the UE that would happen at subframe n+12 on receiving PHICH NACK.

At subframe n+9, the RN reports the decoding result of PUSCH received at the subframe n+4.

At subframe n+10, the eNB sends the scheduling message which contains the scheduling information corresponding to the PUSCH forwarding at subframe n+11.

It is assumed in FIG. 12 that the scheduling message for PUSCH forwarding is transmitted at the subframe n+10, but this invention is not limited to this case. The corresponding scheduling message may be embedded in the grant (or scheduling) message transmitted at the subframe n. Also, The eNB may send the corresponding scheduling message at one of the subframes n+2, n+4, n+6, n+8, and n+10. On the other hand, this explicit scheduling message becomes unnecessary if the rule of non-adaptive retransmission is applied such that the RN forwards the received PUSCH in the resource that was used in the UE's original PUSCH transmission at the subframe n+4.

At the subframe n+11, the RN forwards the PUSCH received at the subframe n+4 to the eNB. If the eNB sends the scheduling message corresponding to this PUSCH forwarding without having the RN's decoding result (i.e., sends the scheduling message before a subframe n+10) or the rule of non-adaptive retransmission is applied to this PUSCH forwarding, the validity of the scheduling message may be dependent of the RN's PUSCH decoding result.

Both the eNB and the RN regard the scheduling information as a valid one if the RN reports the successful PUSCH decoding. There are two possible operations if the RN reports the PUSCH decoding failure: First, the RN may discard the scheduling information which means that the RN does not forward the received PUSCH to the eNB. Second, the RN may forward the erroneously received PUSCH to the eNB by amplify-and-forwarding or soft re-encoding methods.

Also, even though it is assumed in FIG. 12 that the PUSCH is forwarded at the subframe n+11, this invention is not limited to this case: It is also possible for the RN to forward the received PUSCH at the subframe n+9 along with the PUSCH decoding result.

At subframe n+16, the eNB may transmit its decoding result to the RN. Also, the eNB may send a retransmission grant to the RN if the RN reports the decoding success but the eNB fails to decode the forwarded PUSCH. The eNB may transmit a retransmission grant to the UE if neither the eNB nor the RN can decode the PUSCH.

Also, the eNB may transmit a grant message for a new PUSCH transmission if the forwarded PUSCH is decoded successfully.

Also, this invention proposes the method of a RN's PUSCH decoding result (ACK/NACK) and the corresponding PHICH transmission in consideration of two different cases.

1. A first case is a FDD mode.

In the first case, the RN does not have time to deliver the PUSCH decoding result to a eNB prior to the PHICH timing. This means that the PUSCH decoding at the RN does not finish before the PHICH timing.

Figure 13:
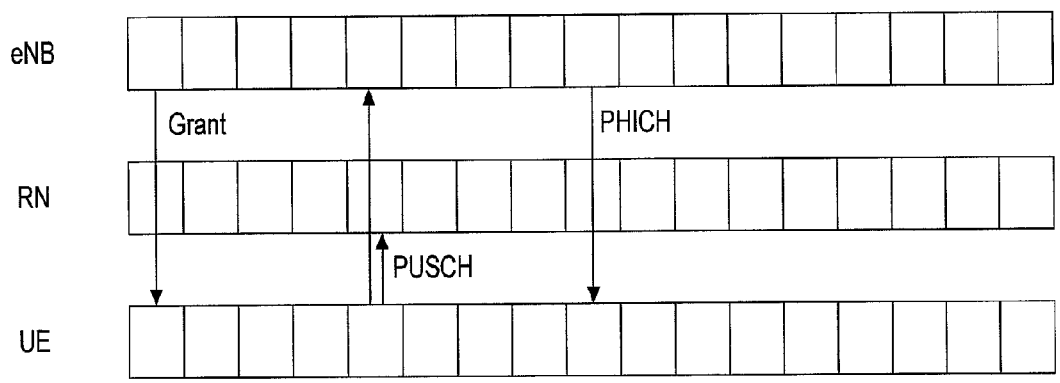
FIG. 13 is a diagram illustrating a PHICH transmission in 3GPP LTE FDD mode.

FIG. 13 shows such an example in 3GPP LTE FDD mode:

At subframe n, an eNB grants a UE's PUSCH transmission via PDCCH. Then, the UE transmits a PUSCH at subframe n+4 and the RN, the eNB, or both try to decode the PUSCH. If the time required for PUSCH decoding is assumed to be 3 ms, the RN can deliver the decoding result to the eNB at subframe n+8 or later.

However, the PHICH timing is predetermined such that the corresponding PHICH is transmitted at the 4th subframe after the PUSCH transmission. So, in the example in FIG. 13, the eNB should transmit PHICH to the UE at the subframe n+8, which implies that the RN cannot deliver the PUSCH decoding result prior to the PHICH transmission timing. Consequently, in this case, the eNB cannot utilize the RN's decoding result in generating the corresponding PHICH content (ACK or NACK) while keeping the predetermined PHICH timing.

Two different solutions of the FDD mode are considered in this invention.

1) A first Solution: A eNB Always Sends PHICH ACK

The first solution in this case is to send "always ACK" at the predetermined PHICH timing.

Figure 14:
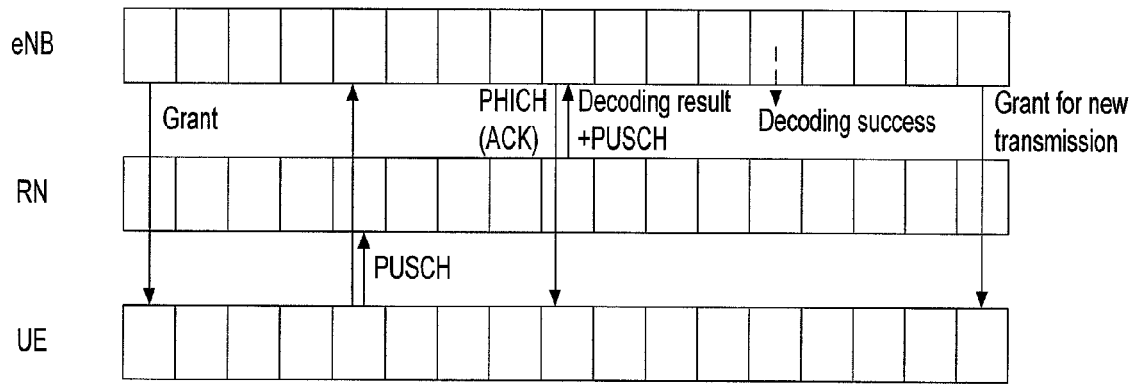
FIG. 14 is a diagram illustrating a PHICH transmission utilizing a decoding result of a relay station in FDD mode according to the present invention.

FIG. 14 shows such an example:

At subframe n, the eNB grants a UE's PUSCH transmission via PDCCH. Then, the UE transmits PUSCH at subframe n+4 and a RN, the eNB, or both try to decode the PUSCH.

At subframe n+8, the eNB transmit PHICH ACK regardless of its PUSCH decoding result. At the same time, the RN delivers the PUSCH decoding result with the received PUSCH data to the eNB. Then, the eNB decodes the PUSCH forwarded by the RN (possibly in combination with that received by the eNB directly).

If the eNB's final decoding is successful, the PUSCH is successfully relayed to the eNB and the eNB can grant a new transmission via PDCCH at subframe n+16 by toggling the new data indicator (NDI) of the HARQ process (FIG. 14).

Figure 15:
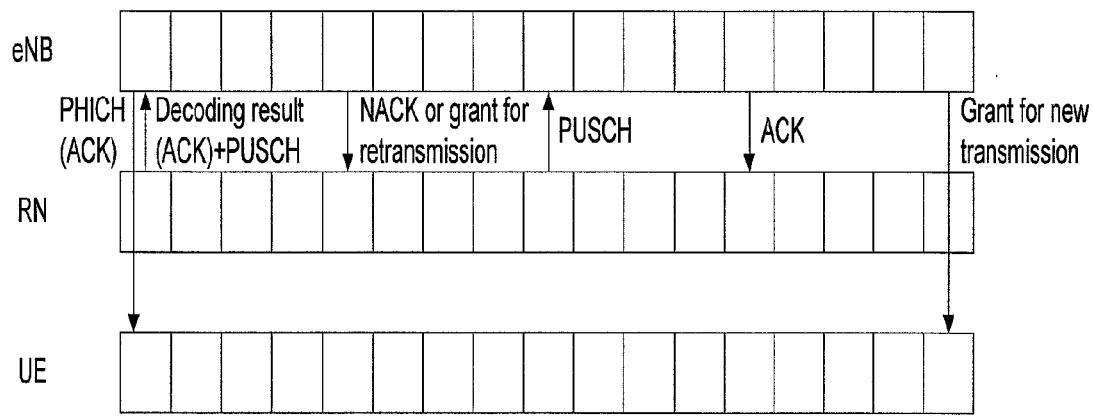
FIG. 15 is a diagram illustrating a PHICH transmission utilizing a decoding result of a relay station in FDD mode according to the present invention.

If the eNB's final decoding is not successful but the RN's decoding result delivered to the eNB is ACK, the eNB does not issue a retransmission of a UE but transmits a retransmission grant or NACK to the RN at subframe n+12 so that the RN can forward the received PUSCH again at the subframe n+16 (FIG. 15).

If neither the eNB nor the RN can decode the PUSCH, the eNB transmits a retransmission grant to the UE via PDCCH at the subframe n+16 by not toggling the NDI of the HARQ process. Then, the UE retransmits the PUSCH at subframe n+20 (FIG. 16).

Figure 16:
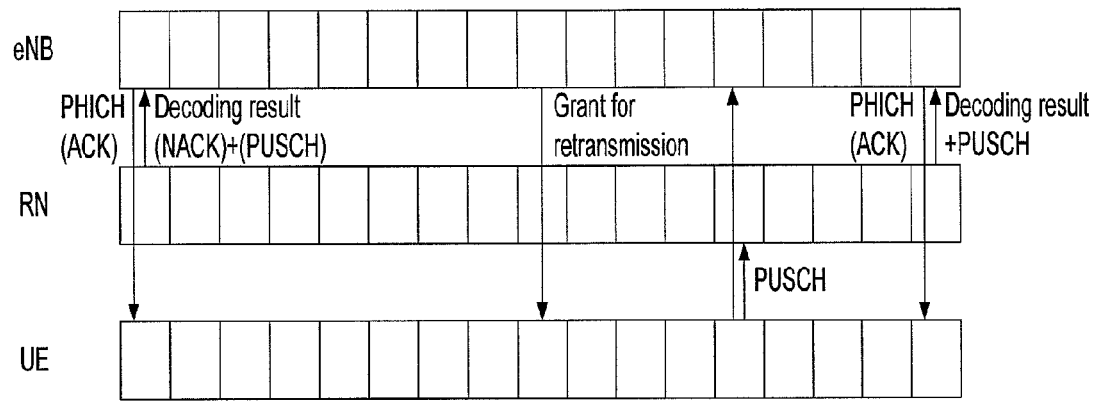
FIG. 16 is a diagram illustrating a PHICH transmission utilizing a decoding result of a relay station in FDD mode according to the present invention.

In FIG. 16, it is possible for the RN to forward an erroneously received PUSCH to the eNB at the subframe n+8 by applying amplify-and-forwarding or soft modulation. Or the RN may forward no PUSCH if its decoding is not successful.

Figure 17:
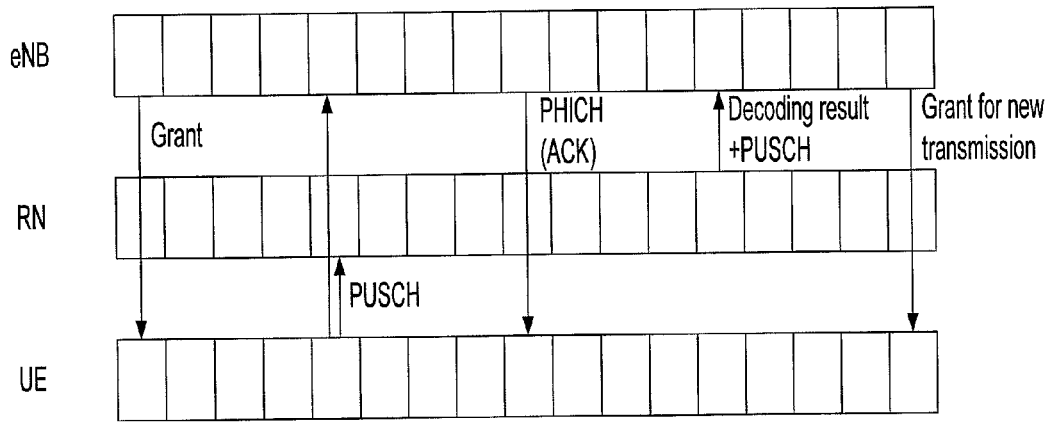
FIG. 17 is a diagram illustrating a PHICH transmission utilizing a decoding result of a relay station in FDD mode according to the present invention.
Figure 18:
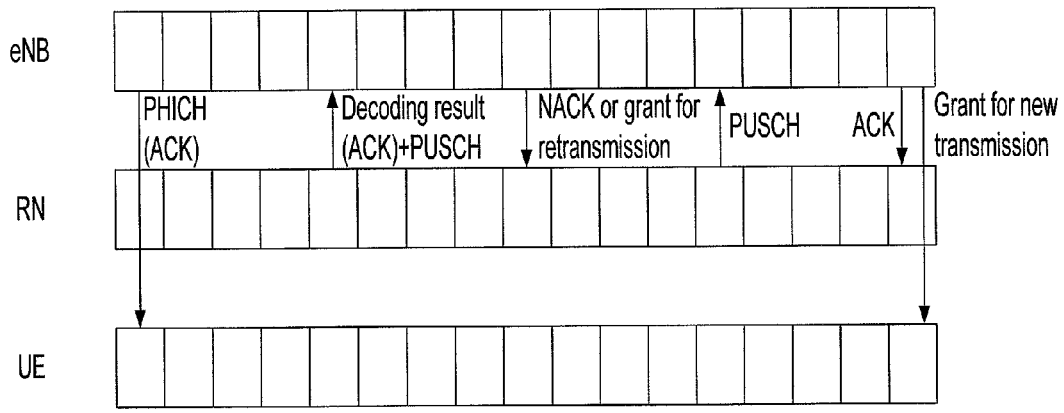
FIG. 18 is a diagram illustrating a PHICH transmission utilizing a decoding result of a relay station in FDD mode according to the present invention.
Figure 19:
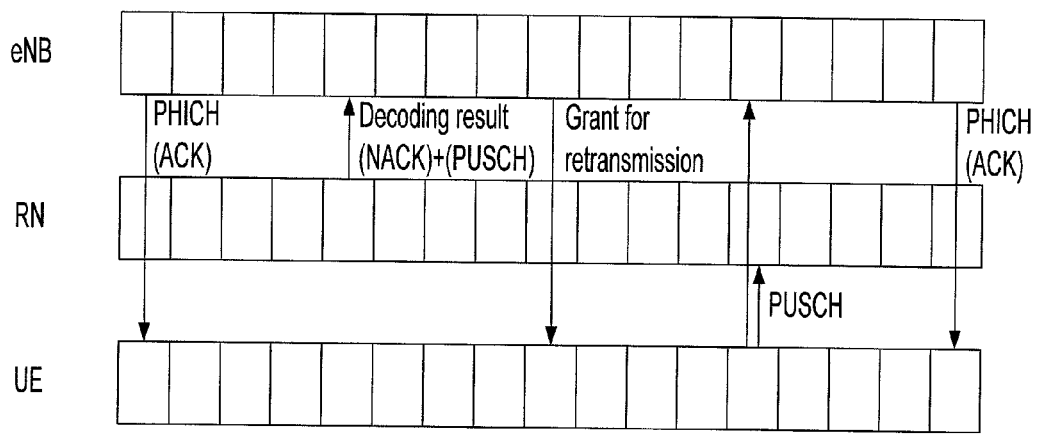
FIG. 19 is a diagram illustrating a PHICH transmission utilizing a decoding result of a relay station in FDD mode according to the present invention.

As illustrated in the above figures, the RN which receives PUSCH from the UE at the subframe n+4 (the corresponding grant is transmitted from the eNB at the subframe n) forwards the received PUSCH at the subframe n+8. However, this invention is not limited to this case and it is also possible for the RN to forward at subframe n+k for 8<k<13. FIGS. 17, 18, and 19 correspond to the case of FIGS. 14, 15, and 16 with k=12, respectively.

In FIG. 17, a eNB transmits PHICH ACK at subframe n+8 and a RN forwards the received PUSCH along with its decoding result at subframe n+12. If the eNB's final decoding is successful, the eNB may grant a new transmission to a UE and/or send ACK to the RN at subframe n+16.

In FIG. 18, a eNB fails to decode the PUSCH forwarded at subframe n+12 but a RN's decoding result is successful. Then, the eNB grants a retransmission or send NACK to the RN at subframe n+16, and the RN retransmits the received PUSCH at subframe n+20.

If the eNB's final decoding is successful, the eNB may grant a new transmission to a UE and/or send ACK to the RN at subframe n+24.

In FIG. 19, a RN fails to decode the PUSCH, so it delivers the corresponding decoding result at subframe n+12. Then, a eNB transmits a retransmission grant to a UE at subframe n+16 by toggling the NDI of the HARQ process. Then, the UE retransmits the PUSCH at subframe n+20.

Another option is to separate a RN's decoding result delivery and PUSCH forwarding.

Figure 20:
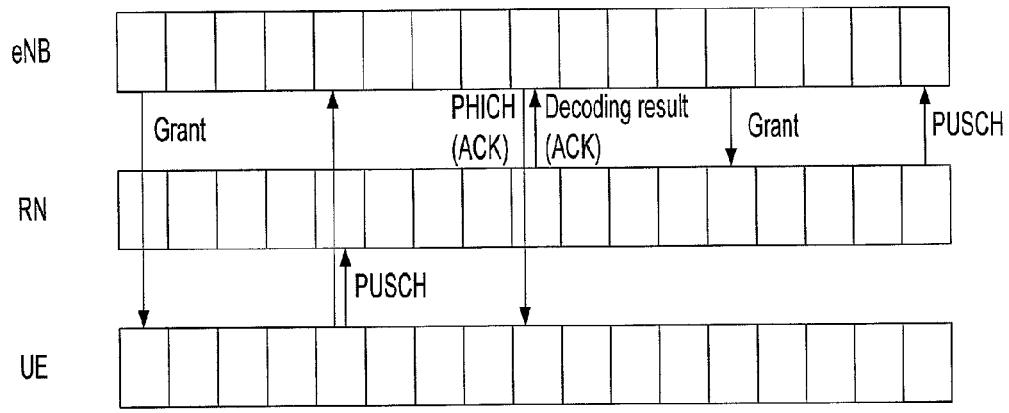
FIG. 20 is a diagram illustrating a PHICH transmission utilizing a decoding result of a relay station in FDD mode according to the present invention.

In FIG. 20, the RN first delivers its decoding result at subframe n+8. If the decoding result is ACK, a eNB sends grant to the RN at subframe n+12 and the RN forwards PUSCH at subframe n+16 according to the grant message.

Figure 21:
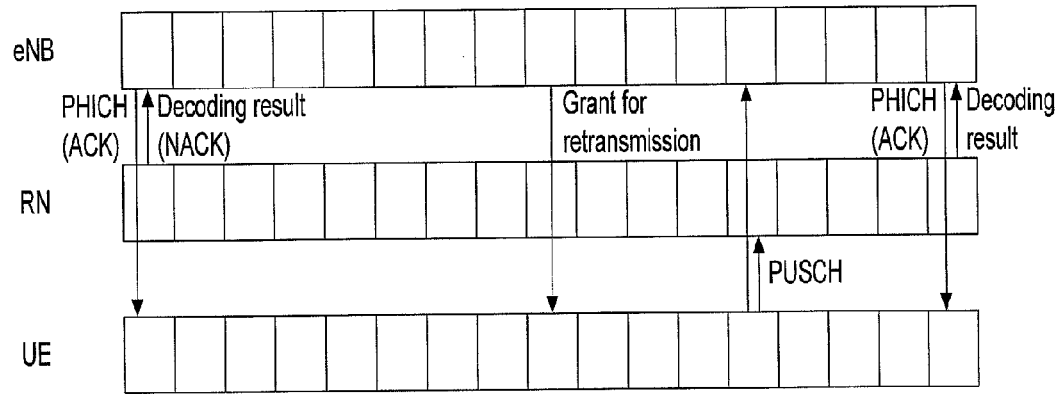
FIG. 21 is a diagram illustrating a PHICH transmission utilizing a decoding result of a relay station in FDD mode according to the present invention.

In FIG. 21, a RN fails to decode the received PUSCH and delivers NACK to eNB. Then, a eNB sends a retransmission grant to a UE at subframe n+16.

One drawback of this "always ACK" method is the degradation of data rate of the UE. In FIG. 14 for example, a UE is allowed to transmit a new PUSCH at subframe n+20 which implies 16 ms periodicity of the UL transmission.

Similarly, in FIG. 16, a UE is granted to retransmit the erred PUSCH at subframe n+16. Compared with the 8 ms periodicity of PUSCH transmission in 3GPP LTE systems, this 16 ms periodicity may cause throughput degradation to some extent. To mitigate this problem, a eNB may allocate more than one sub-HARQ process to a single a UE.

Figure 22:
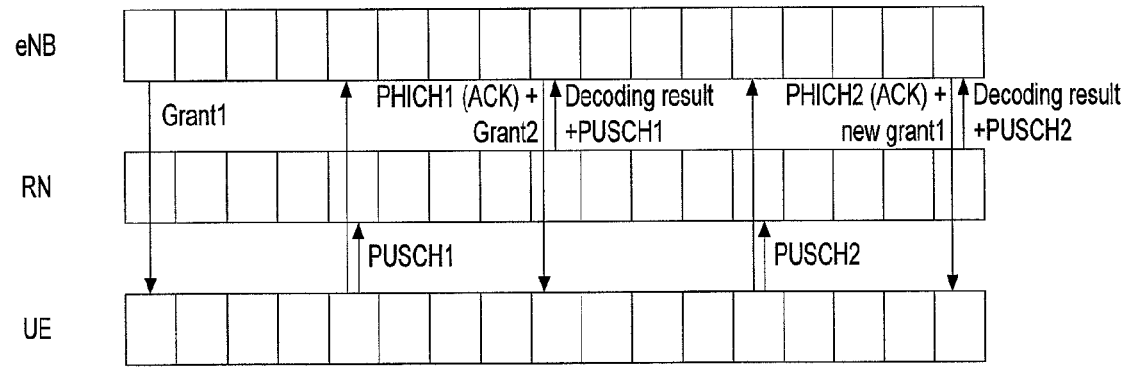
FIG. 22 is a diagram illustrating a PHICH transmission utilizing a decoding result of a relay station in FDD mode according to the present invention.

FIG. 22 illustrates the case where a single a UE has two sub-HARQ processes each of which has 16 ms periodicity. To support this operation, the UE may be configured by high-layer signaling to use multiple sub-HARQ processes each of which operates in a single HARQ process with a longer periodicity. If there are m sub-HARQ processes in a single HARQ process to which the UE is assigned, each sub-HARQ process has the periodicity of 8*m ms. On receiving a retransmission grant at subframe n, the UE sends retransmission at subframe (n+4) for the PUSCH transmitted at subframe (n−8*m+4). As shown in FIG. 16, the UL transmission period of the UE becomes 8 ms which is equivalent to that of the 3GPP LTE systems.

2) A Second Solution: A eNB Sends PHICH According to its own Decoding Result.

Another solution is to send PHICH ACK/NACK according to the eNB's decoding result. The following figures show such an example: At subframe n, the eNB grants a UE's PUSCH transmission via PDCCH. Then, the UE transmits PUSCH at subframe n+4 and a RN, the eNB, or both try to decode the PUSCH.

Figure 23:
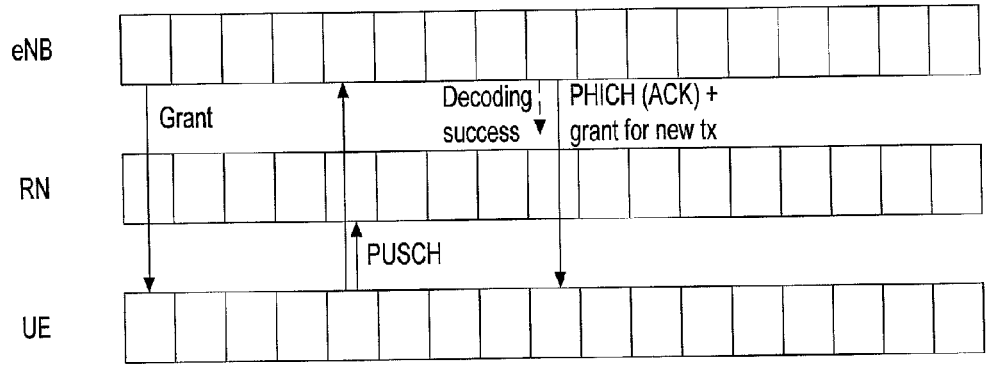
FIG. 23 is a diagram illustrating a PHICH transmission utilizing a decoding result of a relay station in FDD mode according to the present invention.

In FIG. 23, a eNB succeeds in decoding the received PUSCH without having a RN's PUSCH forwarding. Thus, the eNB transmits PHICH ACK at subframe n+8.

Figure 24:
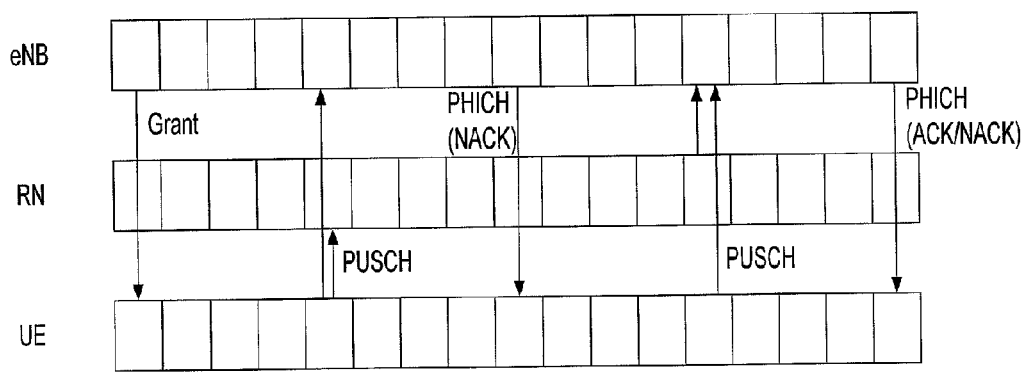
FIG. 24 is a diagram illustrating a PHICH transmission utilizing a decoding result of a relay station in FDD mode according to the present invention.

In FIG. 24, a eNB fails to decode the received PUSCH without having a RN's forwarding PUSCH, so it transmits PHICH NACK to a UE at subframe n+8. In this figure, the RN succeeds in decoding the received PUSCH, so it forwards the PUSCH to the eNB at subframe n+12 on receiving PHICH NACK at subframe n+8. The UE also retransmits the PUSCH at subframe n+12 as it detects PHICH NACK. The transmission of the RN and the UE at subframe n+12 can be arranged over the same resource block(s) in order to exploit the diversity combining effect at the eNB. The eNB transmits the corresponding decoding result via PHICH at subframe n+16.

Figure 25:
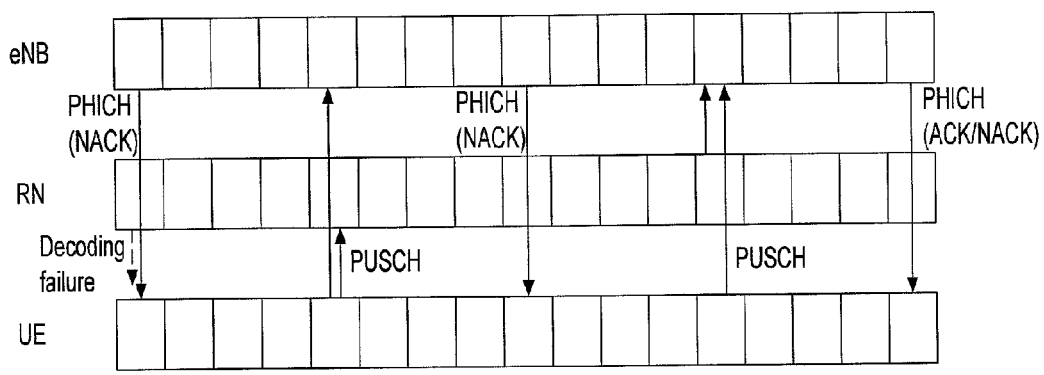
FIG. 25 is a diagram illustrating a PHICH transmission utilizing a decoding result of a relay station in FDD mode according to the present invention.

In FIG. 25, a eNB fails to decode the received PUSCH without having a RN's forwarding PUSCH, so it transmits PHICH NACK to a UE at subframe n+8. In this figure, the RN also fails to decode the received PUSCH, so it listens to the UE's retransmission at subframe n+12. Then, the eNB transmits PHICH NACK at subframe n+16 if it cannot decode the PUSCH without having PUSCH forwarding from the RN. If the RN succeeds in decoding PUSCH and detects PHICH NACK at subframe n+16, it forwards the PUSCH to the eNB at subframe n+20.

In the operation exemplified in FIGS. 24 and 25, a RN operates as follows:

If the RN detects at subframe n+8 PHICH NACK which corresponds to the PUSCH it received at subframe n+4, the RN.

forwards the decoded PUSCH to eNB at subframe n+12 if the PUSCH received at subframe n+4 is decoded successfully;

receives the PUSCH retransmitted from UE at subframe n+12 if the PUSCH received at subframe n+4 is not decoded successfully.

As another option, it is possible for a RN to forward the received PUSCH to a eNB even though the PUSCH is not decoded successfully. The RN may apply amplify-and-forwarding or soft modulation to forward the erred PUSCH to the eNB.

2. A second case is a TDD mode

In the second case, a RN may have enough time to deliver the PUSCH decoding result to a eNB prior to the PHICH timing. This means that the PUSCH decoding at the RN finishes before the PHICH timing.

Table 1 shows the PHICH timing in 3GPP LTE TDD mode: A UE which transmits PUSCH at subframe n receives PHICH at subframe n+k where k is given in Table 1 for each TDD UL/DL configuration and each UL subframe index n.

Table 2 shows the PUSCH transmission timing: The UE which receives grant or PHICH at subframe n transmits PUSCH at subframe n+k where k is given in Table 2 for each TDD UL/DL configuration and each DL subframe.

TABLE 1 k for PHICH transmission timing in TDD mode

| TDD UL/DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

TABLE 2 k for PUSCH transmission timing in TDD mode.

| TDD UL/DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

The RN's PUSCH forwarding may be determined such that the RN forwards the received PUSCH to the eNB at the first UL subframe after 3 subframes. Then, as shown in Table 1, it becomes possible for the RN to deliver its PUSCH decoding result to the eNB prior to the PHICH timing in some subframes of some configurations.

Figure 26:
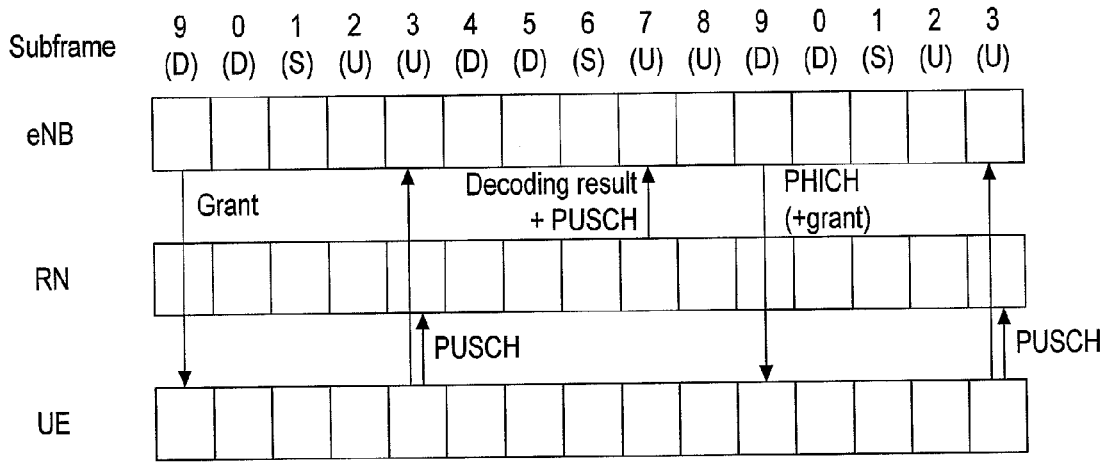
FIG. 26 is a diagram illustrating a PHICH transmission utilizing a decoding result of a relay station in TDD mode according to the present invention.

FIG. 26 shows such an example in TDD UL/DL configuration 1:

At subframe 9, a eNB grants a UE's PUSCH transmission via PDCCH. Then, the UE transmits PUSCH at subframe 3 of the next radio frame and a RN, the eNB, or both try to decode the PUSCH. If the time required for PUSCH decoding is assumed to be 3 ms, the RN can deliver the decoding result to the eNB at subframe 7 along with the PUSCH. Depending on the decoding result, the eNB transmits PHICH (possibly with a grant for a new transmission or retransmission) at subframe 9.

By this operation, the RN can deliver its PUSCH decoding result in advance and the eNB can transmit PHICH at the predetermined PHICH timing. In generating PHICH content at the eNB, logical OR operation can be applied to the decoding results of the eNB and the RN: If one of the eNB and RN decodes PUSCH received at subframe 3 successfully, the eNB transmits ACK on PHICH at subframe 9; otherwise, the eNB transmits NACK.

Figure 27:
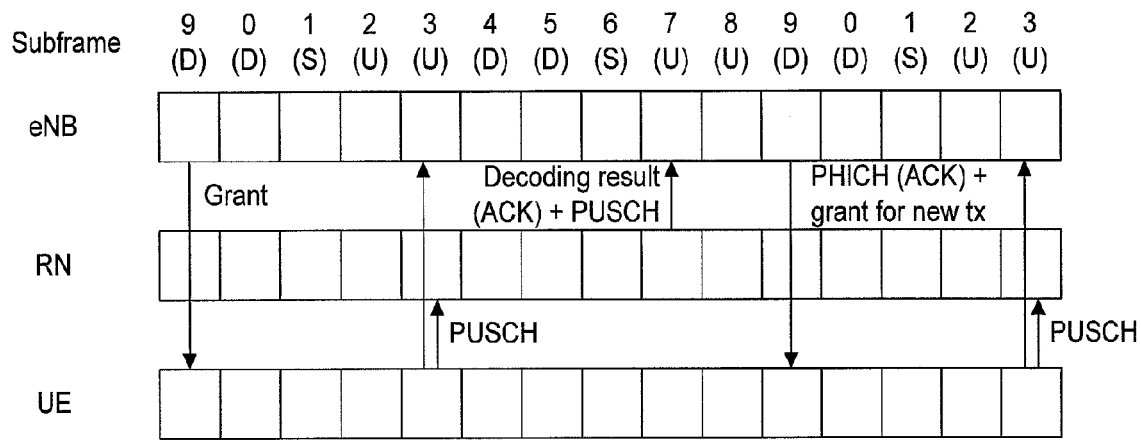
FIG. 27 is a diagram illustrating a PHICH transmission utilizing a decoding result of a relay station in TDD mode according to the present invention.

The detailed operation of the case illustrated in FIG. 26 is given in FIG. 27.

In FIG. 27, a RN succeeds in decoding PUSCH and delivers the decoding result ACK along with PUSCH at subframe 7. a eNB transmits PHICH ACK at subframe 9 and it is possible to grant a new transmission from the a UE.

Figure 28:
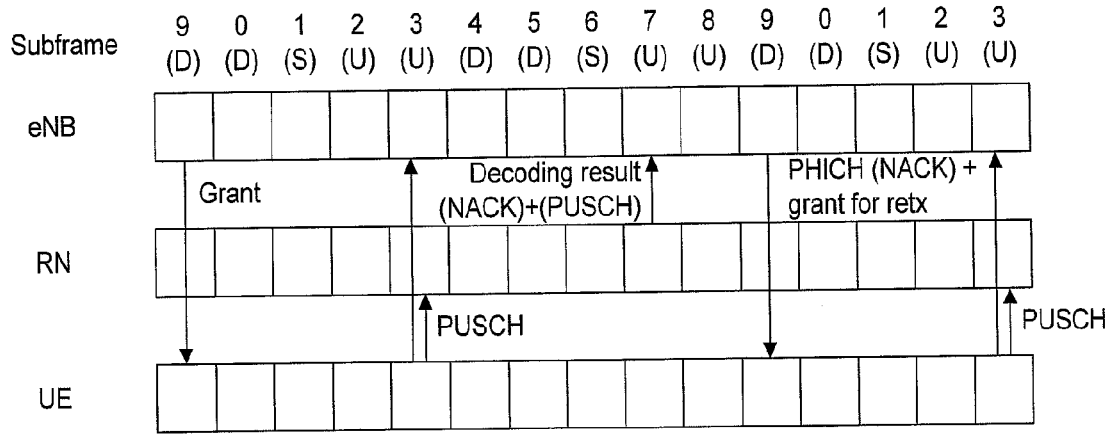
FIG. 28 is a diagram illustrating a PHICH transmission utilizing a decoding result of a relay station in TDD mode according to the present invention.

In FIG. 28, a RN fails in decoding PUSCH so it delivers the decoding result NACK at subframe 7. Then, a eNB transmits PHICH NACK at subframe 9 possibly along with a grant for retransmission in which the NDI of the HARQ process is not toggled.

Figure 29:
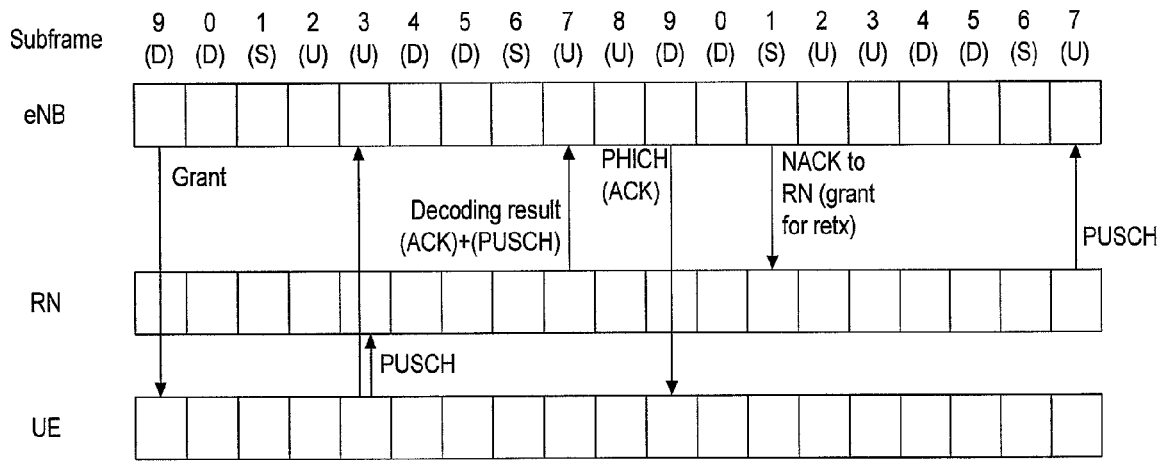
FIG. 29 is a diagram illustrating a PHICH transmission utilizing a decoding result of a relay station in TDD mode according to the present invention.

FIG. 29 shows an example where a RN succeeds in decoding PUSCH but the a eNB's final decoding result of the PUSCH forwarded by the RN is failure. If we assume 3 ms decoding time, the eNB detects the final decoding failure at subframe 0 of the next subframe. Then, the eNB sends NACK (and possibly a retransmission grant) to the RN at subframe 1, and the RN retransmits PUSCH at subframe 7. It is also possible for the eNB to transmit grant for a new transmission at subframe 9 along with PHICH ACK for the new PUSCH transmission of the UE at subframe 3 of the next radio frame.

For some configurations and some subframes, it is impossible for the RN to deliver its PUSCH decoding result prior to the predetermined PHICH timing. In this case, one of the methods developed for Case 1 can be used. One simple option is as follows: If the RN receives PUSCH from the UE at subframe n but cannot deliver the decoding result prior to the PHICH timing, the RN transmits the PUSCH and its decoding result to the eNB at the first UL subframe which appears after subframe n+3 and the eNB uses the "always ACK" at the predetermined PHICH timing.

Figure 30:
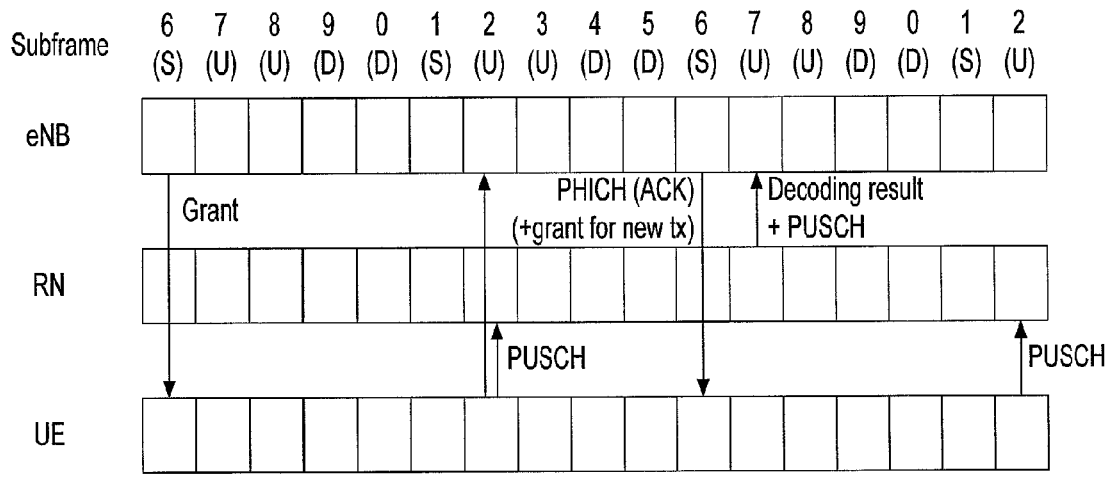
FIG. 30 is a diagram illustrating a PHICH transmission utilizing a decoding result of a relay station in TDD mode according to the present invention.

An example is shown in FIG. 30: A eNB sends UL grant at subframe 6 and a UE transmits PUSCH at subframe 2 of the next radio frame. The eNB transmits PHICH ACK at subframe 6 regardless of the decoding result. It is also possible to send a grant for a new transmission to the UE. A RN delivers its decoding result at subframe 7 along with PUSCH.

When we compare the method in FIG. 26 and FIG. 30, it is obvious that the one in FIG. 26 is a better option in that it enables the eNB to keep the predetermined PHICH timing without using the "always ACK" transmission. Thus, it is possible to prioritize the UL subframes in granting PUSCH transmission to be forwarded via the RN: An UL subframe has high priority if there exists at least one UL subframe between the decoding finish time (e.g., 3 ms) and the corresponding PHICH time (shown in Table 1). One extreme way of this prioritization is not to assign a UL subframe with low priority to the UE served by the RN.

Table 3 shows the a RN's PUSCH forwarding timing in TDD mode. If the RN receives PUSCH from a UE at subframe n, it forwards the received PUSCH to a eNB at subframe n+k where k is given in Table 3 for each UL/DL configuration. The equivalent operation can be described by Table 4: If a RN detects at subframe n UL grant to a UE whose PUSCH transmission it will forward to a eNB, it forwards the received PUSCH to the eNB at subframe n+k where k is given in Table 4 for each UL/DL configuration.

TABLE 3 k for RN's PUSCH forwarding timing in TDD mode

| TDD UL/DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 5 | 4 | 4 | | | 5 | 4 | 4 |
| 1 | | | 5 | 4 | | | | 5 | 4 | |
| 2 | | | 5 | | | | | 5 | | |
| 3 | | | 10 | 9 | 8 | | | | | |
| 4 | | | 10 | 9 | | | | | | |
| 5 | | | 10 | | | | | | | |
| 6 | | | 5 | 4 | 4 | | | 5 | 4 | |

TABLE 4 k for RN's PUSCH forwarding timing in TDD mode

| TDD UL/DL Configuration | DL subframe index n | | | | | | | | | |
|---|---|---|---|---|---|---|---|---|---|---|
| | 0 | 1 | 2 | 3 | 4 | 5 | 6 | 7 | 8 | 9 |
| 0 | 8 | 11 | | | | 8 | 11 | | | |
| 1 | | 11 | | | 8 | | 11 | | | 8 |
| 2 | | | | 9 | | | | | 9 | |
| 3 | 12 | | | | | | | | 14 | 13 |
| 4 | | | | | | | | | 14 | 13 |
| 5 | | | | | | | | | 14 | |
| 6 | 12 | 11 | | | | 12 | 11 | | | 9 |

As described up to this point, methods according to the present invention can be realized by software, hardware, or their combination. For example, methods according to the present invention may be stored in a storage medium (e.g., internal terminal, flash memory, hard disk, etc.), and may be realized by codes or commands within a software program that is executable by a processor, such as microprocessor, controller, microcontroller, application specific integrated circuit (ASIC).

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for transceiving data with both a mobile station and a relay station, comprising:
   receiving, by the base station from the mobile station, a first uplink data;
   decoding, by the base station, the first uplink data;
   transmitting, by the base station to the terminal, an ACK signal, regardless of whether a result of the decoding is successful or unsuccessful;
   receiving, by the base station, a second uplink data, wherein the second uplink data is transmitted from the relay station based on the first uplink data of the mobile station; and
   receiving, by the base station, a decoding result of the relay station with respect to the first uplink data of the mobile station, wherein if the decoding result of the relay station is unsuccessful, the second uplink data transmitted is used to decode the first uplink data of the mobile station, wherein the first uplink data is received according to multiple sub-HARQ (Hybrid Automatic Repeat reQuest) processes, and the second uplink data is transmitted according to a single HARQ process, and wherein a period of the single HARQ process is a multiple of a period of one sub-HARQ process.

2. The method of claim 1, further comprising:
transmitting, by the base station, a grant for retransmission to the mobile station if the decoding results are unsuccessful.

3. The method of claim 1, further comprising:
transmitting, by the base station, a NACK signal to the relay station if the decoding result of the relay station is successful and the usage to decode the first uplink data of the mobile station is unsuccessful.

4. The method of claim 1, further comprising:
transmitting, by the base station, a scheduling information to the mobile station, wherein the scheduling information indicates uplink resources and downlink resources allocated to the mobile station, wherein the second uplink data from the relay station is received at a specific uplink resource, which is not allocated to the mobile station.

5. The method of claim 1, further comprising:
transmitting, by the base station to the relay station, a control signal for indicating an operation mode of the relay station.

6. The method of claim 5, wherein the operation mode of the relay station is a first operation mode or a second operation mode.

7. The method of claim 6, wherein the first operation mode is defined such that the relay node operates a reception (RX) mode in first frequency band while operating a transmission (TX) mode in second frequency band at a specific subframe, and operates the TX mode in the first frequency band while operating the RX mode in the second frequency band at the next subframe; and a second operation mode is defined such that the relay node operates the RX mode both in first frequency and in second frequency band at a specific subframe and operates the TX mode in both frequency bands at the next subframe.

* * * * *